US012097619B2

United States Patent
Lin et al.

(10) Patent No.: US 12,097,619 B2
(45) Date of Patent: Sep. 24, 2024

(54) PREDICTIVE CONTROL METHOD FOR TORQUE-RATE CONTROL AND VIBRATION SUPPRESSION

(71) Applicant: FANUC CORPORATION, Yamanashi (JP)

(72) Inventors: Hsien-Chung Lin, Fremont, CA (US); Yu Zhao, Santa Clara, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 234 days.

(21) Appl. No.: 17/935,293

(22) Filed: Sep. 26, 2022

(65) Prior Publication Data
US 2024/0116178 A1    Apr. 11, 2024

(51) Int. Cl.
    B25J 9/16    (2006.01)
(52) U.S. Cl.
    CPC ............ B25J 9/1633 (2013.01); B25J 9/163 (2013.01); B25J 9/1638 (2013.01); B25J 9/1641 (2013.01); B25J 9/1651 (2013.01); B25J 9/1664 (2013.01)
(58) Field of Classification Search
    CPC ........ B25J 9/1633; B25J 9/163; B25J 9/1638; B25J 9/1641; B25J 9/1651; B25J 9/1664; G05B 2219/39195; G05B 13/048; G05B 2219/40459; G05B 2219/42058; G05B 2219/42166; G05B 2219/42167
    USPC .................. 700/245–264; 318/568.11–568.25
    See application file for complete search history.

(56) References Cited

U.S. PATENT DOCUMENTS

| | | | | |
|---|---|---|---|---|
| 5,371,451 A | * | 12/1994 | Toyosawa | G05B 19/19 700/45 |
| 5,773,938 A | * | 6/1998 | Seong | H02P 23/186 360/71 |
| 5,920,169 A | * | 7/1999 | Hamamura | G05B 19/404 318/568.22 |
| 6,505,085 B1 | * | 1/2003 | Tuttle | B25J 9/1605 700/28 |
| 6,694,196 B2 | * | 2/2004 | Tuttle | G05B 13/047 700/28 |

(Continued)

FOREIGN PATENT DOCUMENTS

| | | |
|---|---|---|
| CN | 109202884 A | 1/2019 |
| CN | 111203883 A | 5/2020 |
| WO | 2021168590 A1 | 9/2021 |

*Primary Examiner* — Jaime Figueroa
(74) *Attorney, Agent, or Firm* — John A. Miller; Shumaker, Loop & Kendrick, LLP

(57) ABSTRACT

A method and system for robot motion control using a model predictive control (MPC) technique including torque rate control and suppression of end tooling oscillation. An MPC module includes a robot dynamics model which inherently reflects response nonlinearities associated with changes in robot configuration, and an optimization solver having an objective function with a torque rate term and inequality constraints defining bounds on both torque and torque rate. The torque rate control in the MPC module provides an effective means of controlling jerk in robot joints, while accurately modeling robot dynamics as the robot changes configuration during a motion program. End tooling oscillation dynamics may also be included in the MPC objective function and constraints in order to automatically control end tooling vibration in the calculations of the MPC module.

22 Claims, 5 Drawing Sheets

(56) References Cited

U.S. PATENT DOCUMENTS

| | | | |
|---|---|---|---|
| 6,738,679 B2* | 5/2004 | Fujita | G05B 19/404 |
| | | | 318/568.15 |
| 6,826,450 B2 | 11/2004 | Watanabe et al. | |
| 7,205,743 B2 | 4/2007 | Iwashita et al. | |
| 7,405,525 B2* | 7/2008 | Hoppe | G05B 19/19 |
| | | | 318/632 |
| 8,271,134 B2 | 9/2012 | Kato et al. | |
| 9,037,292 B2* | 5/2015 | Lim | B62D 57/032 |
| | | | 318/568.22 |
| 10,618,164 B2 | 4/2020 | Wang et al. | |
| 10,900,343 B1* | 1/2021 | Buerger | E21B 44/02 |
| 10,960,549 B2 | 3/2021 | Inagaki et al. | |
| 11,132,062 B2* | 9/2021 | Bajaj | H02P 25/064 |
| 11,298,822 B2* | 4/2022 | Ogata | B25J 9/1633 |
| 11,478,931 B2* | 10/2022 | Bâcher | B25J 9/1671 |
| 11,513,497 B2* | 11/2022 | Egi | G05B 13/048 |
| 11,577,389 B2* | 2/2023 | Lu | B25J 9/12 |
| 11,579,698 B2* | 2/2023 | Bajaj | H02P 7/025 |
| 11,648,681 B2* | 5/2023 | Ju | B25J 9/1607 |
| | | | 700/245 |
| 11,701,774 B2* | 7/2023 | Rinke | B25J 9/161 |
| | | | 700/253 |
| 2001/0033146 A1* | 10/2001 | Kato | G05B 5/01 |
| | | | 318/568.22 |
| 2003/0018400 A1* | 1/2003 | Tuttle | G05B 13/047 |
| | | | 700/29 |
| 2005/0113977 A1 | 5/2005 | Nihei et al. | |
| 2006/0082340 A1 | 4/2006 | Wantanabe et al. | |
| 2006/0119307 A1* | 6/2006 | Kiyotani | G05B 19/19 |
| | | | 318/632 |
| 2011/0208356 A1* | 8/2011 | Kato | B25J 9/163 |
| | | | 700/253 |
| 2012/0016521 A1* | 1/2012 | Lapham | B25J 9/1656 |
| | | | 901/10 |
| 2012/0245734 A1* | 9/2012 | Yun | B62D 57/032 |
| | | | 901/1 |
| 2014/0303777 A1* | 10/2014 | Takagi | B25J 9/1633 |
| | | | 700/261 |
| 2015/0039128 A1* | 2/2015 | Oaki | B25J 9/1651 |
| | | | 700/253 |
| 2016/0096271 A1* | 4/2016 | Taylor | B25J 9/1628 |
| | | | 901/46 |
| 2016/0202670 A1* | 7/2016 | Ansari | G05B 13/026 |
| | | | 700/45 |
| 2018/0043245 A1* | 2/2018 | Zhu | G06T 19/20 |
| 2019/0217468 A1* | 7/2019 | Ogata | B25J 9/1633 |
| 2020/0201291 A1* | 6/2020 | Egi | G06N 5/02 |
| 2020/0282558 A1* | 9/2020 | Kim | B25J 9/1607 |
| 2020/0356173 A1* | 11/2020 | Bajaj | G08B 6/00 |
| 2021/0007874 A1* | 1/2021 | Galiana Bujanda | A61F 5/028 |
| 2021/0365123 A1* | 11/2021 | Bajaj | G08B 6/00 |
| 2022/0281123 A1* | 9/2022 | Robbins | B25J 17/00 |
| 2024/0004472 A1* | 1/2024 | Bajaj | H02P 7/025 |
| 2024/0157555 A1* | 5/2024 | Wang | B62D 57/032 |

* cited by examiner

PREDICTIVE CONTROL METHOD FOR TORQUE-RATE CONTROL AND VIBRATION SUPPRESSION

BACKGROUND

Field

The present disclosure relates generally to the field of industrial robot motion control and, more particularly, to a robot control method and system using an optimization-based model predictive control technique, including an objective function with a torque rate term and inequality constraints defining bounds on both torque and torque rate, where the torque rate limits provide control of jerk in the robot joints, and further including end tooling vibration dynamics in the optimization model.

Discussion of the Related Art

The use of industrial robots to perform a wide range of manufacturing, assembly and material movement operations is well known. Many of these operations and tasks are performed by articulated robots, such as five- or six-axis robots with a servo motor at each rotational joint. Control of such robots is provided in real time, where an end tool motion program is divided into small increments of motion, and a robot controller performs the real-time feedback control calculations to compute joint torque commands which move the robot end tool according to the prescribed motion program.

In robot controllers as described above, the feedback control calculations are typically performed using classical control methods such as proportional-integral-differential (PID), where the joint torque signals are computed based on an error signal between the commanded step and the current robot state, along with an integral of the error signal and a differential of the error signal, with each term having a predefined gain constant. Classical control techniques are known to work well in some circumstances, but can become unstable when large input steps are defined. In addition, the gains in the PID controller are defined based on some assumed dynamic response characteristics of the robot, and the PID model cannot adapt to changes in dynamic response due to changes in robot configuration. These configuration-based changes in dynamic response can be large for motion programs which involve significant posture changes by the robot. For example, consider a robot task in which the robot moves from a very compact configuration with the arm sections collapsed tightly together to a very extended configuration with the arm sections all reaching in the same direction from the robot base to the end tool. The dynamic response of the robot (e.g., inertia properties, natural frequencies in bending) are much different in the latter configuration than in the former.

In some applications, such as material handling and spot welding, the object being moved by the robot arm is quite heavy, and has its own dynamic response characteristics which can in turn affect the robot dynamic response. Additionally, in these applications, the robot is typically moved as quickly as possible from a start point to a destination point, resulting in high accelerations. Robot motion control can only be accurately performed in such applications if the oscillation dynamics of the robot itself and the end tooling or payload are included in the robot controller calculations. Furthermore, robots typically have mechanical constraints—such as permissible ranges of joint acceleration and jerk—which must be satisfied during operation. Some control techniques do not allow the direct control of parameters such as these, which can cause joints to exceed mechanical constraints, or errors in resulting motions.

In light of the circumstances described above, there is a need for an improved robot motion control technique which incorporates both robot configuration-related nonlinearities and end tooling dynamics in integrated control module computations, while satisfying robot operational constraints.

SUMMARY

The present disclosure describes a method and system for robot motion control using a model predictive control (MPC) technique including torque rate control and suppression of end tooling oscillation. An MPC module includes a robot dynamics model which inherently reflects response nonlinearities associated with changes in robot configuration, and an optimization solver having an objective function with a torque rate term and inequality constraints defining bounds on both torque and torque rate. The torque rate control in the MPC module provides an effective means of controlling jerk in robot joints, while accurately modeling robot dynamics as the robot changes configuration during a motion program. End tooling oscillation dynamics may also be included in the MPC objective function and constraints in order to automatically control end tooling vibration in the calculations of the MPC module.

Additional features of the presently disclosed systems and methods will become apparent from the following description and appended claims, taken in conjunction with the accompanying drawings.

DETAILED DESCRIPTION OF THE EMBODIMENTS

The following discussion of the embodiments of the disclosure directed to robot predictive motion control and vibration suppression is merely exemplary in nature, and is in no way intended to limit the disclosed devices and techniques or their applications or uses.

Industrial robots are used for a variety of manufacturing, assembly and material movement operations. For some applications, such as material dispensing and laser/arc welding, the programmed velocity of the robot tool is limited by the operation being performed, and rapid motions of the robot arm are not needed or wanted. In such applications, specifically when robot accelerations are low, and the end tooling or material payload which is carried by the robot is relatively lightweight in comparison to the robot, the dynamic response of the robot (e.g., arm bending vibrations) is not a significant consideration. This simplifies the robot motion control.

Figure 1:
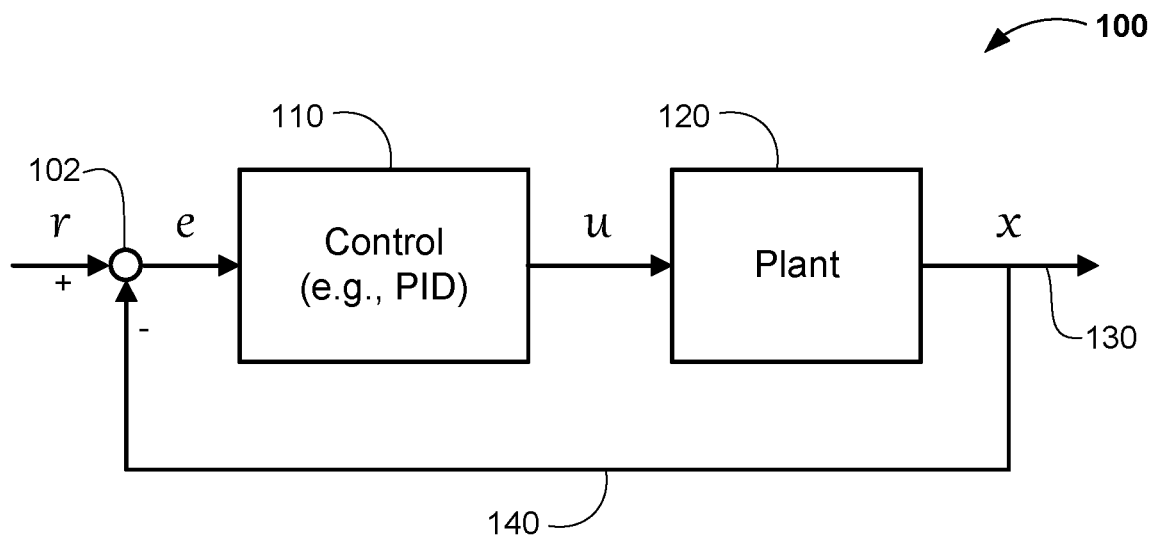
FIG. 1 is a block diagram illustration of a classical control technique used for robots and other types of systems, as known in the art.

FIG. 1 is a block diagram illustration 100 of a classical control technique used for robots and other types of systems, as known in the art. Robot controllers are often programmed using classical control techniques as shown in FIG. 1. At each control cycle, a reference signal r defining a new robot state is provided from the robot motion program. For example, the reference signal r might define that the robot tool center point must move 3 mm in a certain direction, and at a constant velocity, during the current motion increment. The reference signal r is provided to a junction 102, where a current robot state x is also provided as feedback. An "error" signal e is computed as the difference between the reference signal r and the current robot state x.

The "error" signal e is provided to a control module 110 which uses a classical control method such as proportional-integral-differential (PID) control. In PID control, system control signals are computed based on the error signal e, along with an integral of the error signal e and a differential of the error signal e, with each of the three terms having a predefined gain constant. In the case of a robot, the control signals which are computed by the control module 110 typically consist of a torque vector u which defines a torque for each joint motor in the robot for the current control cycle.

The torque vector u is provided from the control module 110 to a "plant" 120, which in the case of a robot is the robot with its arms, joint motors, etc. The robot joint motors respond to the torque vector u, causing the robot to move in accordance with the system dynamics of the robot (masses, inertias, etc.). The new robot state x (typically described by joint positions and rotational velocities) is measured by robot sensors (e.g., joint encoders) and provided on line 130. The robot state x is also provided on feedback line 140 to the junction 102 where it is used to computed the error signal e for the next robot control cycle.

The classical PID control technique of FIG. 1 performs well in control of many types of systems including robots. The PID control technique exhibits strengths in disturbance rejection and noise insensitivity, and is particularly well suited to systems which are not highly nonlinear and in which very large reference steps are not used. In some robot applications, however, a combination of high payload mass, rapid robot motions (e.g., high accelerations) and large robot configuration changes cause significant and changing dynamic response characteristics to be exhibited by the robot. In these applications, the PID control technique may not perform most effectively.

Figure 2A:
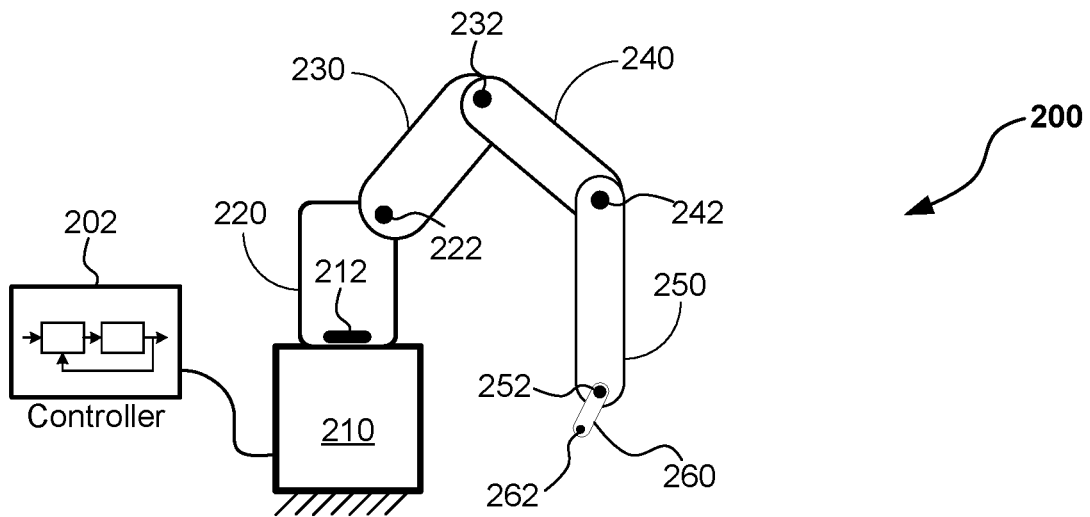
FIGS. 2A and 2B are simplified illustrations of an industrial robot undergoing a pose or configuration change, where the configuration change results in a significant change in dynamic response of the robot.
Figure 2B:
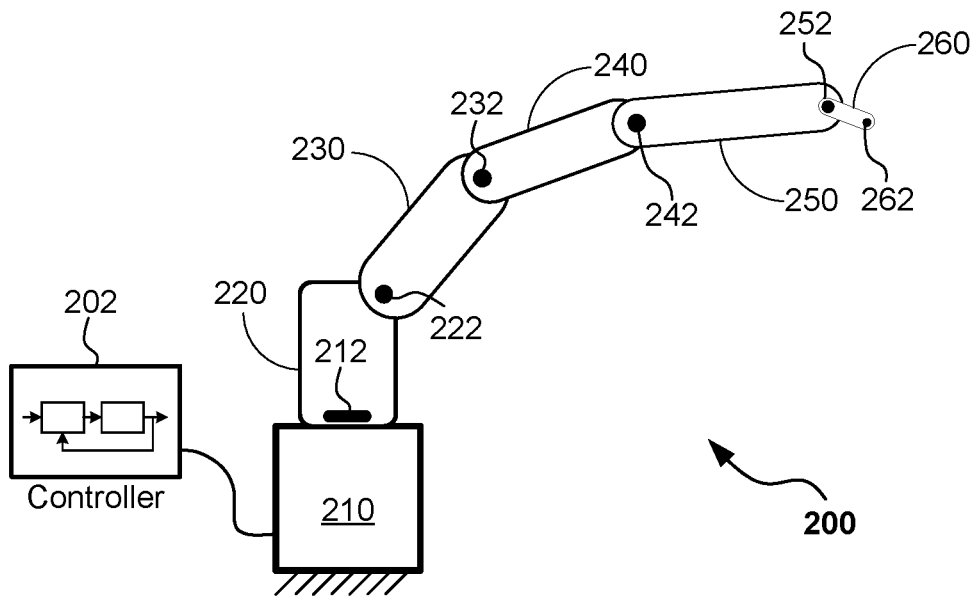

FIGS. 2A and 2B are simplified illustrations of an industrial robot 200 undergoing a pose or configuration change, where the configuration change results in a significant change in dynamic response of the robot. The robot 200 is illustrated in two dimensions in FIGS. 2A/2B, however it is to be understood that the robot 200 represents any articulated industrial robot—such as five-axis and six-axis robots, with some of the joint axes being orthogonal to others and providing general three-dimensional (3D) movement capability. The robot 200 is controlled by a robot controller 202. The control methodology employed by the controller 202 is the subject of the present disclosure.

The robot 200 includes a fixed pedestal 210, a base 220 coupled to the pedestal 210 via a vertical-axis joint 212, an arm 230 coupled to the base 220 via a joint 222, an arm 240 coupled to the arm 230 via a joint 232, an arm 250 coupled to the arm 240 via a joint 242, and a tool 260 coupled to the arm 250 via a joint 252. A tool center point 262 is defined on the tool 260. Each of the joints in the robot 200 is a rotational joint having a motor (e.g., a servo motor) providing a torque at the joint as commanded by the controller 202 and having a joint encoder providing angular position data back to the controller 202. The robot 200 is simply illustrative, and is drawn to suit the purpose of the present discussion. Other robots may include different numbers of arms and joints, a first joint which is not vertical, joints which permit axial rotation of one arm relative to another, etc.

All of the elements discussed above are visible in both FIGS. 2A and 2B. In FIG. 2A, the robot 200 is configured in a near reach pose, where the arms are folded so as to position the tool center point 262 near the pedestal 210. In FIG. 2B, the robot 200 is configured in a far reach pose, where the arms are stretched out essentially end-to-end so as to extend the tool center point 262 to a position as far as possible from the pedestal 210. It can be readily understood by one skilled in the art that the robot 200 will exhibit markedly different dynamic response characteristic in the configuration of FIG. 2A than in the configuration of FIG. 2B. That is, in FIG. 2A (and similar compact poses), the arm centers of gravity are all relatively close to the pedestal 210, causing their mass moments of inertia about the vertical axis joint 212 to be relatively low. In contrast, in FIG. 2B (and similar extended poses), the arm centers of gravity are all relatively distant from the pedestal 210, causing their mass moments of inertia about the vertical axis joint 212 to be relatively high. This effect is further amplified if the tool 260 is a heavy tool such as a spot welding apparatus, or the tool 260 carries a heavy object. Other dynamic response properties of the robot 200 (e.g., Coriolis matrix) are similarly affected by changes in robot configuration.

The significant configuration changes illustrated in FIGS. 2A and 2B are commonly encountered in some robotic applications. For example, in spot welding applications, the tool center point (spot welder) must be moved to many different weld point locations, some of which may be near the robot base and some of which may be distant, and the movement between welding operations must be completed as quickly as possible. Likewise, in material handling applications, the tool center point (e.g., gripper or lifting fork) must be moved from a part pickup location to a dropoff location, where one of the locations may be near the robot base and the other may be distant, and the movement between pickup and dropoff must be completed as quickly as possible.

In order to properly reflect configuration-based changes in robot dynamics, it is possible to use model predictive control (MPC) in robot controllers rather than classical control techniques such as PID. MPC is a technique which involves running a simulation model of a dynamic system (the robot in this case) and performing an optimization computation, iteratively over time, to calculate values of control signals (e.g., motor torques) which meet the robot motion objective while satisfying a set of constraints. The robot system model used in an MPC controller inherently reflects the dynamic response which result from changes in robot configuration as illustrated in FIGS. 2A and 2B.

Figure 3:
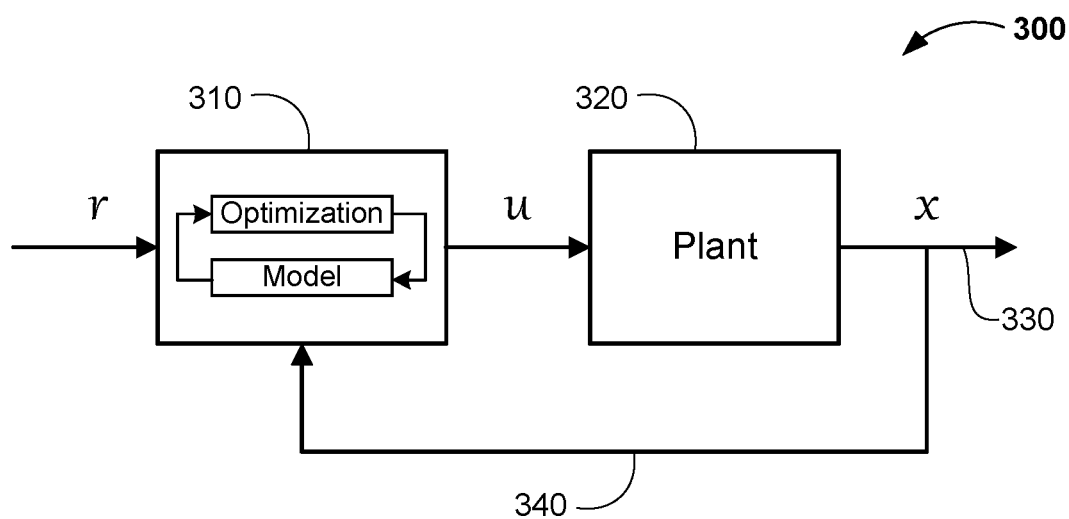
FIG. 3 is a block diagram illustration of a model predictive control (MPC) technique used for control of a system such as a robot, according to an embodiment of the present disclosure.

FIG. 3 is a block diagram illustration 300 of a model predictive control (MPC) technique used for control of a system such as a robot, according to an embodiment of the present disclosure. In the system 300, the reference signal r is provided to a control module 310. Unlike the control module 110 of FIG. 1, the control module 310 does not compute control signals using calculations with constants tuned to the generic behavior of the system. Instead, the control module 310 includes a system dynamic model and an optimization solver to compute optimal values of the control signals which will result in the best robot response in accordance with the reference signal r.

The control signals from the box 310, which again are embodied in a torque vector u, are provided to a plant 320, which in this case is a robot with its motors and its mechanical properties. The torque vector u contains a torque command for each of the joint motors in the robot. The plant 320 (i.e., the robot) responds to the motor torque signals as described earlier with respect to FIG. 1, and the robot state x (joint positions and velocities) is output on line 330, and also provided as feedback to the control module 310 on line 340.

FIG. 3 illustrates the system 300 at a high level in basic conceptual form. The system 300 can be configured such that the system model and the optimization computations control other aspects of robot behavior in order to achieve performance characteristics not possible with prior art control techniques. The predictive motion control and vibration suppression system of the present disclosure—described in detail below—includes these configurations, which overcome the shortcomings of existing control methods and systems.

Figure 4:
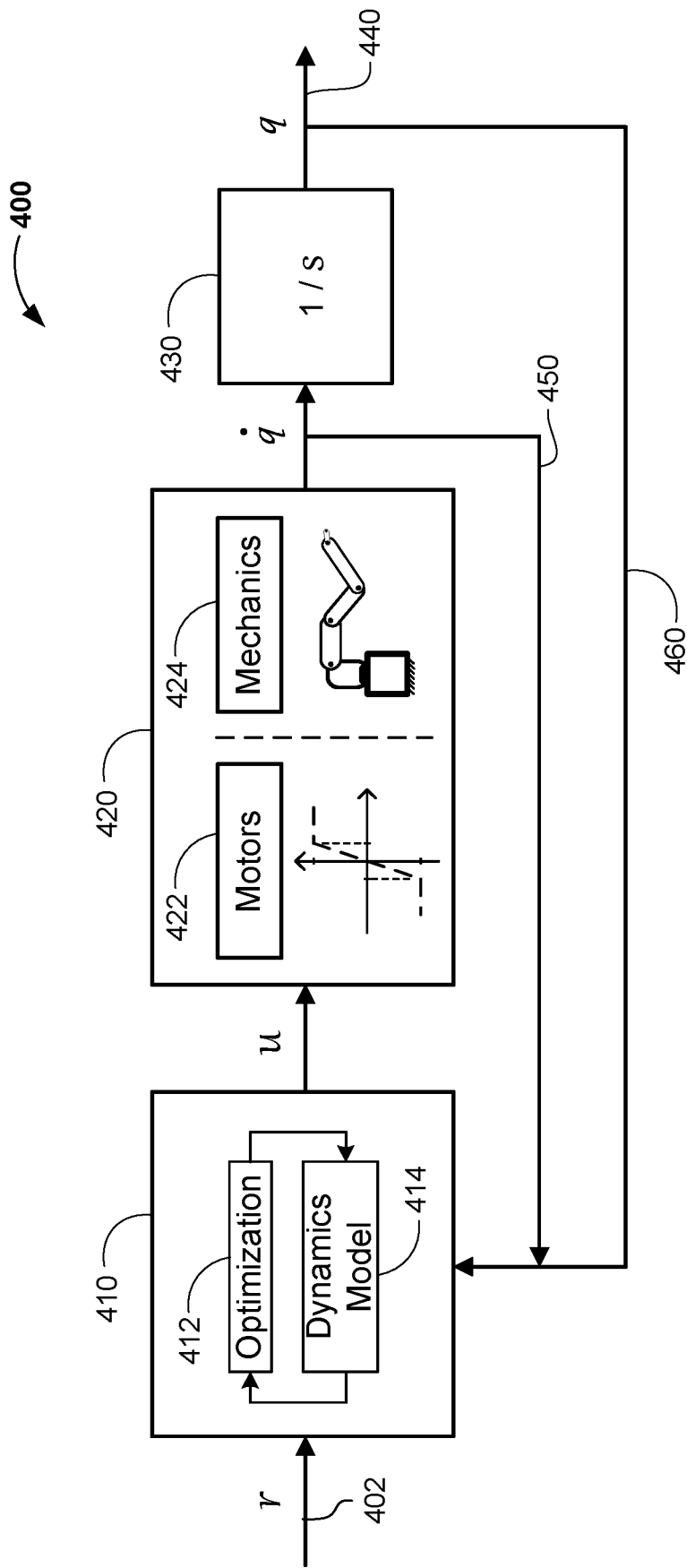
FIG. 4 is a block diagram illustration of an industrial robot motion control system including a model predictive control technique with torque rate control and vibration suppression, according to an embodiment of the present disclosure.

FIG. 4 is a block diagram illustration of an industrial robot motion control system 400 including a model predictive control technique with torque rate control and vibration suppression, according to an embodiment of the present disclosure. The system 400 includes a control module 410 having an optimization block 412 and a dynamics model block 414. The control module 410 receives the reference signal r on a line 402 and robot state data (q and) on feedback lines 450 and 460. The optimization block 412 computes an optimal control sequence or signal to achieve the prescribed reference, and the dynamics model block 414 is used in the optimization computation to predict the future state. The optimization block 412 and the dynamics model block 414 operate iteratively until the predicted future state matches the reference state within some tolerance, and system constraints are met. Details of the computations performed in the optimization block 412 and the dynamics model block 414 are discussed below.

In one embodiment, the output of the control module 410 is the motor torque vector u provided to a robot 420 (the "plant"). The robot 420 includes joint motors 422 and mechanics 424. The motors 422 in the robot 420, like any electric motor, may experience saturation—where the magnetic flux density levels off no matter how much additional magnetizing current is provided. In other words, the motors 422 cannot deliver unlimited amounts of torque. Because of motor saturation, robot joints may overshoot their target positions when input steps are large. This makes it important for the control module 410 to provide smooth and accurate motor torque vector control to the robot 420.

The robot mechanics 424 include all of the mass, inertia and friction properties of the arms and joints in the robot 420. Altogether, the joint motors 422 and the mechanics 424 respond to the motor torque vector u—causing the robot 420 to assume a new state, defined by joint velocities q̇ and, after an integral block 430, joint positions q. The robot state data q and q̇ are provided to the control module 410 on the feedback lines 450 and 460, as mentioned earlier.

Following is a discussion of the mathematical formulations and the computations employed in the control module 410.

The robot dynamics can be computed using the following equation of motion:

$$\tau = M(q)\ddot{q} + C(q)\dot{q} + G(q) \tag{1}$$

where M is an inertia matrix defining mass and inertia properties of all arms/links in the robot, C is a Coriolis matrix, and G is a gravity vector. The M and C matrices have dimensions of six by the number of arms/links. The G vector has dimensions of six by one. The M, C and G matrices/vector are all a function of (that is, defined based on) joint positions q, where q (and its first and second derivatives q̇ and q̈) are vectors having dimensions of one by the number of robot joints. The joint positions q in Equation (1) correspond with the joint positions q on the line 440 in FIG. 4, and likewise for derivatives. τ is a torque vector defining torque at each of the joint motors in the robot.

Then as discussed earlier, let u=τ (i.e., the control signal from the control module 410 is the motor torque of Equation (1)), and let the robot state vector x be defined as:

$$x = \begin{bmatrix} q \\ \dot{q} \end{bmatrix} \tag{2}$$

From Equations (1) and (2) above, it then follows that the change in the robot state is a function of the robot state x itself and the applied torque u. That is:

$$\dot{x} = f(x, u) = \begin{bmatrix} \dot{q} \\ \ddot{q} \end{bmatrix} = \begin{bmatrix} \dot{q} \\ M(q)^{-1}[\tau - C(q)\dot{q} - G(q)] \end{bmatrix} \tag{3}$$

The continuous-time system in Equation (3) is then discretized by the orthogonal collocation method on finite elements. Using all of the above, an optimization computation to be used in MPC control can be defined as follows:

$$\min \|x_N - x_r\|_{Q_N}^2 + \sum_{k}^{N-1} \|x_k - x_r\|_Q^2 + \|u_k\|_R^2 \tag{4}$$

Such that the following constraints are satisfied;

$$x_{k+1} = f(x_k, u_k) \tag{5}$$

$$x_{lb} \le x_k \le x_{ub} \tag{6}$$

$$u_{lb} \le u_k \le u_{ub} \tag{7}$$

$$x_0 = \hat{x}_0 \tag{8}$$

In Equations (4)-(8), x is the robot state vector at various steps as designated by its subscripts, and u is the motor torque vector (the output of the control module; the input to the robot); x and u were discussed above. The subscripts have the following meanings; N is the prediction horizon, k is the index of the time step (i.e., 1, 2, . . . , N), and r designates the reference value (input on the line 402 of FIG. 4). Additionally, the subscripts Q and R on the norms are positive definite matrices to weight the state and input variables; as an example, $\|x\|_Q^2 = x^T Q x$.

Equation (4) is the optimization objective function which minimizes the deviation between the reference state (the target state, which is given) and the state computed by the system dynamics model (Equation (3)), by varying the input variable (the torque u). Equation (5) is an equality constraint which defines how to predict the next step value for the state variable x based on the current step value of x and the current step value of the input variable u; this is determined using the system dynamics model (Equation (3)). Equations (6) and (7) are inequality constraints which place upper and lower bounds on allowable values of the state variable x and the input variable u, respectively. Finally, Equation (8) defines that the state $x_0$ for the initial step in the optimization computation (when k=0) is equal to the robot state at the completion of the previous reference r, as observed by the robot state feedback signal from sensors.

In one embodiment, the optimization and system dynamics calculations described above can be used in an MPC-based controller (e.g., the control module 410 of FIG. 4) to control robot motor torque in order to achieve a given robot reference state, while accounting for changes in robot system dynamics associated with changes in robot configuration, and also incorporating real-world constraints (such as torque bounds associated with motor saturation).

In industrial robots, excessive values of jerk (the rate of change of joint angular acceleration) are known to cause vibration in the robot, high forces and torques on the robot joints, and premature wear in joints and joint motors. The present disclosure provides a technique of controlling jerk in robot joints while following the robot motion program, accurately modeling robot system dynamics and adhering to system constraints. This is done by further enhancement of the previously-discussed MPC-based control computations, and this preferred embodiment is described in detail below.

Recall the equation of motion defining the robot dynamics, listed in Equation (1) above. Taking the time derivative of Equation (1) results in the following:

$$\dot{\tau}=M(q)\dddot{q}+\dot{M}(q)\ddot{q}+C(q)\ddot{q}+\dot{C}(q)\dot{q}+\dot{G}(q) \quad (9)$$

The variables in Equation (9) were all defined above with respect to Equation (1), where a dot above a variable (e.g., $\dot{M}$) indicates a time derivative of a matrix or vector previously defined. Thus, $\dot{\tau}$ is the rate of change of motor torque ("torque rate"), and $\dddot{q}$ is jerk (rate of change of acceleration) in the robot joints.

In the preferred embodiment, torque rate is used as the robot control variable (instead of torque), and both torque and torque rate are bounded by constraints in the optimization computation. Using these techniques, jerk in the robot joints can be controlled.

Therefore, in the torque rate MPC formulation, let $u=\dot{\tau}$ (i.e., the control signal from the control module 410 is the motor torque rate of Equation (9)), and let the robot state vector x be defined as:

$$x = \begin{bmatrix} q \\ \dot{q} \\ \ddot{q} \\ \tau \end{bmatrix} \quad (10)$$

From Equations (9) and (10) above, it then follows that the change in the robot state is a function of the robot state x itself and the applied torque u. That is:

$$\dot{x} = f(x, u) = \begin{bmatrix} \dot{q} \\ \ddot{q} \\ M(q)^{-1}\left[\dot{\tau} - \dot{M}(q)\ddot{q} + C(q)\ddot{q} + \dot{C}(q)\dot{q} + \dot{G}(q)\right] \\ \dot{\tau} \end{bmatrix} \quad (11)$$

The continuous-time system in Equation (11) is then discretized by the orthogonal collocation method on finite elements. Using Equation (11) to define robot dynamics as a function of torque rate (rather than using Equation (3) which is based on torque), an optimization computation to be used in the MPC control module 410 of FIG. 4 can be defined as follows:

$$\min \|x_N - x_r\|_{Q_N}^2 + \sum_{k}^{N-1} \|x_k - x_r\|_Q^2 + \|u_k\|_R^2 \quad (12)$$

Such that the following constraints are satisfied;

$$x_{k+1}=f(x_k,u_k) \quad (13)$$

$$x_{lb} \leq x_k \leq x_{ub} \quad (14)$$

$$u_{lb} \leq u_k \leq u_{ub} \quad (15)$$

$$x_0=\hat{x}_0 \quad (16)$$

In the optimization formulation of Equations (12)-(16), the state variable x now includes torque $\tau$ along with joint motions, as defined in Equation (10), and the control variable u is now torque rate $\dot{\tau}$. Thus, in the optimization objective function of Equation (12), the control variable $u_k$ is now a torque rate term ($\dot{\tau}_k$) rather than a torque term ($\tau_k$). The robot dynamics constraint of Equation (13) now uses the robot equation of motion as defined in Equation (9), which is torque rate based, to predict the robot state x at the next step k+1. Equation (14) is the same as Equation (6) discussed earlier, defining upper and lower bounds on the robot state x. Because the robot state x includes the torque $\tau$, the inequality constraint of Equation (14) enforces upper and lower bounds on the joint motor torque to ensure that torque remains within specified bounds. Equation (15) is an inequality constraint which places bounds on torque rate $\dot{\tau}$, which is the control variable u in this formulation. Equation (16) is the same as Equation (8) discussed earlier.

The robot predictive control formulation embodied in Equations (9)-(16) and described above includes torque rate in both the objective function and the constraints, thereby controlling jerk in robot joints while simultaneously following the robot motion program including complex robot dynamics associated with the robot undergoing large configuration changes. This combination of capabilities is not available in existing robot control methodologies, whether using classical control techniques or otherwise.

The model predictive control (MPC) formulation described above, and in Equation (9) in particular, models the robot dynamics including the effects of changes in robot configuration. In some robotic applications, however, the end tooling (or the material payload carried by the robot) adds mass and flexibility which can affect robot dynamic response. In cases such as these, it would be advantageous to include end tooling (or payload) oscillation dynamics in the MPC formulation.

Figure 5:
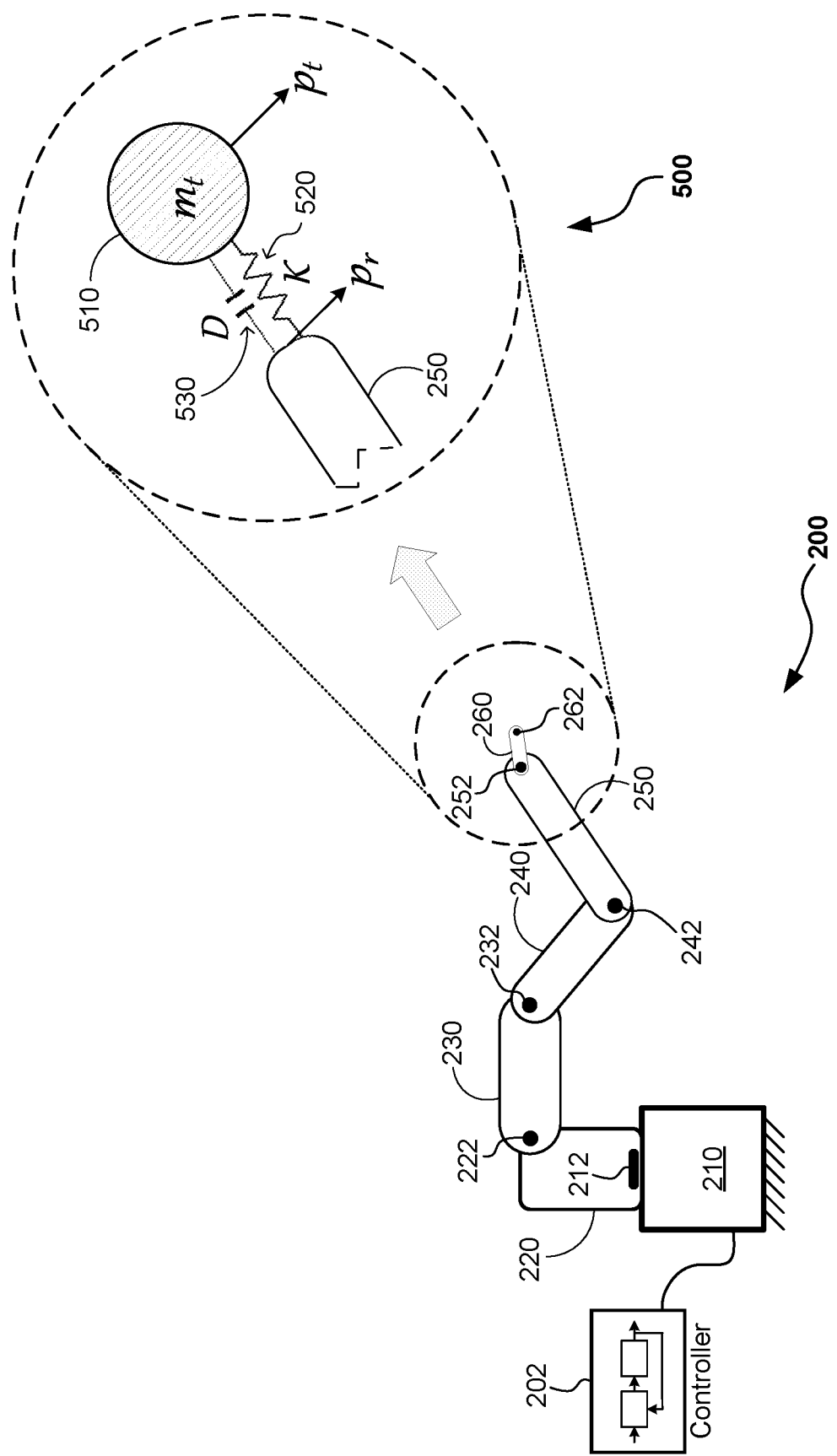
FIG. 5 is an illustration of the robot of FIGS. 2A/2B with an end tooling mass-spring-damper system which is incorporated into the model predictive control computations in the control module of FIG. 4, according to an embodiment of the present disclosure.

FIG. 5 is an illustration of the robot 200 of FIGS. 2A/2B with an end tooling mass-spring-damper system 500 which is incorporated into the model predictive control computations in the control module of FIG. 4, according to an embodiment of the present disclosure. The robot 200 described previously with respect to FIGS. 2A/2B included a tool 260 represented generally by a simple small link. The tool 260 was shown as being coupled to the robot arm 250. In FIG. 5, the exploded view at the right shows the robot arm 250 with the mass-spring-damper system 500 replacing the tool 260.

The mass-spring-damper system 500 includes a tool mass 510 coupled to the robot arm 250 via a spring 520 and a damper 530. The tool mass 510 has a mass value of m t which is representative of the mass of a heavy tool such as a spot welding apparatus, or the mass of a heavy material payload being carried by the robot 200. The spring 520 has a spring constant K, and the damper 530 has a damping constant D, values of which may be determined empirically.

It is to be understood that an additional rotational joint—such as the joint 252 (FIG. 2)—could be included in the robot mechanization. In other words, the tool/link 260 could be included as shown in FIG. 2, and the mass-spring-damper system 500 could be attached at the end of the tool/link 260. This is simply a matter of robot design/architecture. The key point is that the mass-spring-damper system 500, wherever it is coupled to the robot, adds degrees of freedom which may be included in the MPC formulation in order to control end tooling oscillation dynamics.

The tool mass 510 has a position vector $p_t$, and the end of the robot arm 250 has a position vector $p_r$. The mass-spring-damper system 500 is shown as a two degree of freedom (DOF) system in the 2D illustration of the robot 200 in FIG. 5. Therefore the position vectors p t and p r contain x and y positions for each of the points. A 3-DOF formulation (including x, y and z positions) or a 6-DOF formulation (including three positions and three rotations) could also be defined, as would be understood by one skilled in the art.

Following is a discussion of how the end tooling oscillation dynamics are modeled using the mass-spring-damper system 500 described above. Deflection of the tool mass 510 with respect to the end of the robot arm 520 is defined as a residual displacement $e=p_t-p_r$. Oscillation dynamics may then be defined as:

$$m_t\ddot{e}+D\dot{e}+Ke=m_t\ddot{p}_r=m_t[J(q)\ddot{q}+\dot{j}(q,\dot{q})\dot{q}] \quad (17)$$

where J is a Jacobian matrix defining a relationship between Cartesian space and joint space, and variables having a dot or double-dot are first or second derivatives, respectively.

Then let the system states be defined as $x=[q\ \dot{q}\ \ddot{q}]^T$ and $\xi=[e\ \dot{e}]^T$. Given Equation (17) and the definitions above related to the mass-spring-dam per system 500, it then follows that the end tooling oscillation dynamics can be described by:

$$\dot{\xi} = f_e(\xi, x) = \begin{bmatrix} \dot{e} \\ \ddot{e} \end{bmatrix} = \begin{bmatrix} \dot{e} \\ J\ddot{q} + \dot{J}\dot{q} - K/m_t e - D/m_t \dot{e} \end{bmatrix} \quad (18)$$

The continuous-time system in Equation (18) is then discretized by the orthogonal collocation method on finite elements. Using all of the above, an optimization computation to be used in MPC control, including end tool oscillation dynamics along with robot dynamics, can be defined as follows:

$$\min \|x_N - x_r\|^2_{Q_N} + \sum_{k}^{N-1} \|x_k - x_r\|^2_Q + \|u_k\|^2_R + \|\xi_k\|^2_{Q_e} \quad (19)$$

where the objective function above is minimized subject to the following constraints being satisfied;

$$x_{k+1}=f_r(x_k,u_k) \quad (20)$$

$$\xi_{k+1}=f_e(\xi_k,x_k) \quad (21)$$

$$x_k \in X \quad (22)$$

$$u_k \in U \quad (23)$$

$$x_0=\hat{x}_0 \quad (24)$$

The objective function above is similar to Equation (4) discussed earlier, except Equation (19) now includes the term for end tooling oscillation dynamics, which are to be minimized. Constraint Equation (20) is the same as Equation (5) discussed earlier, defining how to predict the next step value for the state variable x based on the current step value of x and the current step value of the input variable u. Equation (21) is an equality constraint which defines how to predict the next step value for the state variable based on the current step value of and the current step value of the state variable x; this is determined using the end tooling oscillation dynamics model (Equation (18)). Equations (22) and (23) define the allowable or feasible values of the state variable x and the input (control) variable u, respectively; these may be the same as Equations (6)-(7) discussed earlier (inequality constraints which place upper and lower bounds on the allowable values). Equation (24) is the same as Equation (8) discussed earlier.

The MPC formulation described above in Equations (19)-(24) adds the end tooling oscillation dynamics (the mass-spring-damper system 500 of FIG. 5) into the torque-based robot control formulation of Equations (4)-(8) discussed earlier. In another embodiment, the end tooling oscillation dynamics could be added into the torque rate-based robot control formulation of Equations (12)-(16); such an embodiment would combine the benefits of torque rate robot control (management of jerk in robot joints) and end tooling oscillation dynamics modeling (vibration suppression), in a system which inherently incorporates the changes in robot dynamics associated with changes in robot configuration as illustrated in FIGS. 2A and 2B, while accurately following a prescribed motion program even in the presence of motor saturation.

The torque rate model predictive control technique described above has been demonstrated in simulations to contain jerk in robot joints within predefined limits by controlling the applied torque rate, while following a prescribed robot motion program. In contrast, when the same robot motion program was controlled using a torque-based MPC implementation, the jerk in the robot joints exceeded the allowable values at multiple points in the simulation.

In another set of simulations, when the end tooling oscillation dynamics was added into an MPC controller, the amplitude of vibrations was reduced and the vibrations were suppressed (damped out) much more quickly, compared to a comparable MPC controller without end tooling oscillation dynamics included in the model and optimization computations.

Figure 6:
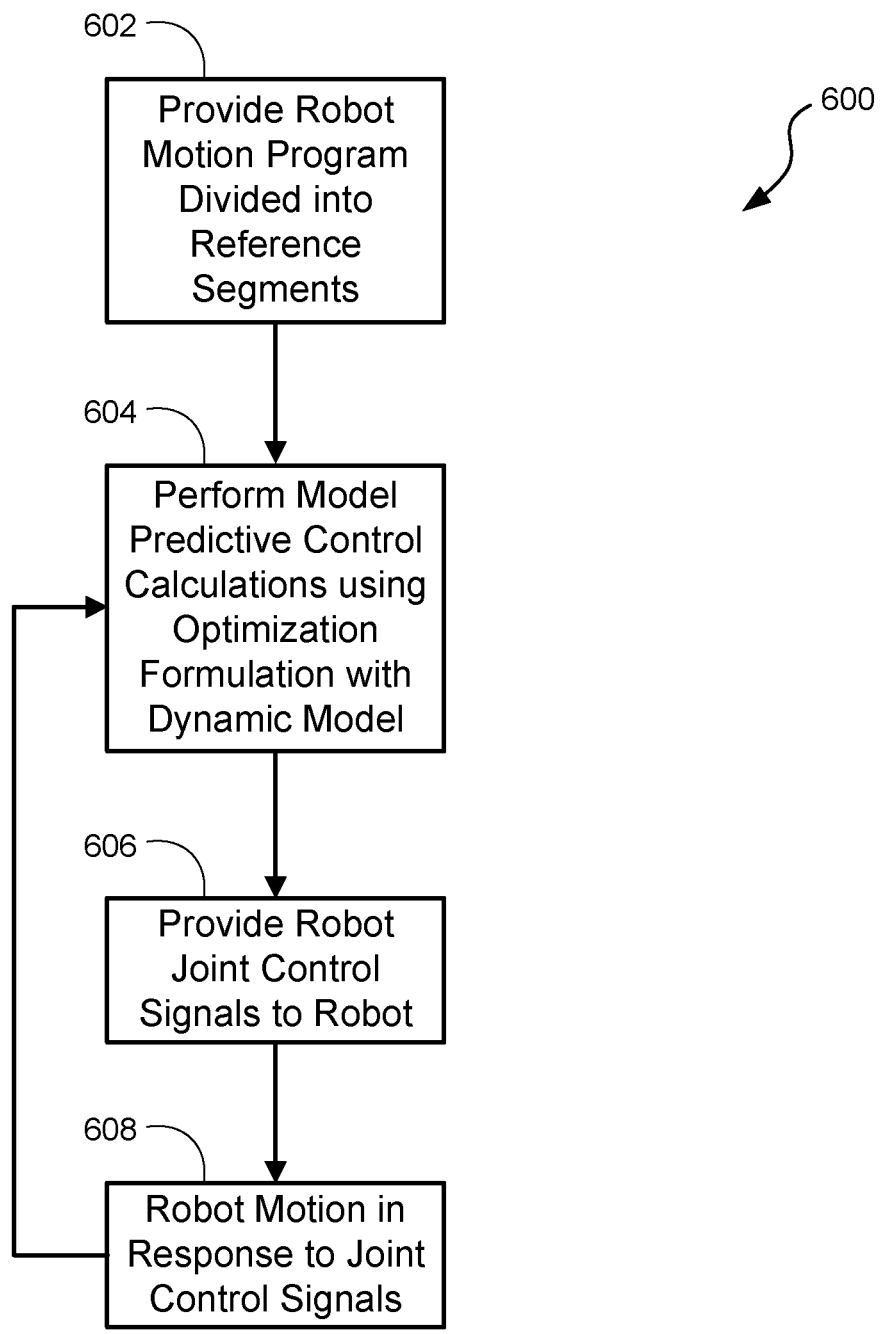
FIG. 6 is a flowchart diagram of a method for robot predictive motion control and vibration suppression, according to an embodiment of the present disclosure.

FIG. 6 is a flowchart diagram 600 of a method for robot predictive motion control and vibration suppression, according to an embodiment of the present disclosure. The steps of the flowchart diagram 600 are performed using the robot controller 202 and the robot 200 of FIGS. 2A and 2B.

At box 602, a robot motion program is provided. The motion program may be computed by the controller 202 itself, or the motion program may be computed by an external computer and provided to the controller 202. The motion program might prescribe motions for a robot gripper to move from a pick location to a place location in a material handling application, or the motion program might prescribe motions for a spot welding tool to move from a previous weld location to a next weld location, for example. The motion program is divided into the reference steps r as described previously.

At box 604, model predictive control (MPC) calculations are performed in the robot controller 202, to determine control signals to send to the robot 200. As described above, the MPC formulation uses a system dynamics model and an optimization computation to converge on a control signal which will cause the robot to best follow the reference step motion while satisfying system constraints. The constraints include behaving according to the system dynamics model, and system state variables (responses) and control variables (inputs) remaining within allowable bounds.

Various embodiments of the MPC formulation, to be used in the box 604, were described in detail above. Equations (9)-(16) described an embodiment in which torque rate is the control variable (the input to the robot), where the torque rate is included in a term in the optimization objective function and also included in the constraints. This embodiment has been shown to be effective in controlling jerk in the robot joints. Equations (17)-(24) described an embodiment in which end tooling oscillation dynamics are added to a torque-based MPC formulation, as a term in the optimization objective function and also included in the constraints. This embodiment has been shown to be effective in managing oscillations in the robot system due to a large end tooling mass and high robot accelerations. In a preferred embodiment, the MPC formulation uses torque rate as the control variable and also includes end tooling oscillation dynamics; that is, both a torque rate term and an end tooling dynamics term are included in the optimization objective function, and both torque rate and end tooling dynamics are included in the constraints. In this embodiment, the prescribed motion program is followed even with real-world motor saturation characteristics, jerk is controlled within defined limits in the robot joints, and robot system oscillation is reduced in amplitude and is damped out more quickly.

At box 606, robot joint control signals are provided from the robot controller 202 to the robot 200. In the preferred embodiment described above, the joint control signals are torque rate signals for each joint in the robot 200. At box 608, the robot 200 moves in response to the torque rate input signals, according to the robot's mechanical properties and motor performance characteristics, as shown in the box 420 of FIG. 4. The robot state (joint angles and angular velocities, and also joint torques when torque rate is the control variable) are provided as feedback to the control module of the robot controller 202, as shown in FIG. 4 and also in the return loop from the box 608 to the box 604 of FIG. 6. The robot state data is used along with the reference step signal in the MPC calculations, as described earlier.

As the robot 200 completes its motion corresponding to one set of input (torque rate) signals, a next reference step signal r is used in the MPC control module to compute a next set of input (torque rate) signals. This process continues until the robot motion program is completed (e.g., the robot drops off the workpiece at its destination location), at which point a new motion program is provided at the box 602.

Throughout the preceding discussion, various computers and controllers are described and implied. It is to be understood that the software applications and modules of these computers and controllers are executed on one or more electronic computing devices having a processor and a memory module. In particular, this includes a processor in the robot controller 202 of FIGS. 2A and 2B discussed above, where the controller 202 is understood to include the control module 310 of FIG. 3 and the control module 410 of FIG. 4. Specifically, the processor in the controller 202 and the control module 410 is configured to perform the robot predictive motion control calculations with torque rate control and vibration suppression embodied in the foregoing equations and described above.

While a number of exemplary aspects and embodiments of the methods and systems for robot predictive motion control with torque rate control and vibration suppression have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for robot predictive control, said method comprising:
providing a motion program for a robot;
performing a predictive control calculation, using a computer with a processor and memory, said calculation including an optimization computation with an objective function which determines a torque rate vector to minimize a difference between a predicted robot state and a reference robot state from the motion program while satisfying a constraint defining a robot dynamics equation of motion which computes the predicted robot state based on the torque rate vector and a constraint defining bounds on the torque rate vector;
providing the torque rate vector from the computer to the robot; and
moving, by the robot, in response to the torque rate vector.

2. The method according to claim 1 wherein the torque rate vector includes a torque rate of change for each joint motor in the robot.

3. The method according to claim 1 wherein the torque rate vector is defined as a control variable in the optimization computation, and state variables in the optimization computation include joint angular position, velocity and acceleration vectors, and a joint torque vector.

4. The method according to claim 1 wherein the optimization computation computes the predicted robot state for a series of steps over a planning horizon.

5. The method according to claim 4 the optimization computation is executed to convergence and the torque rate vector is provided to the robot at each control cycle of the computer.

6. The method according to claim 5 wherein, at each control cycle, a new value of the reference robot state from the motion program is provided, and a current actual robot state vector is provided as feedback to the computer and used as an initial condition constraint in the optimization computation.

7. The method according to claim 1 wherein additional constraints used in the optimization computation define upper and lower bounds on state variables including joint angular position, velocity and acceleration vectors, and a joint torque vector.

8. The method according to claim 1 wherein the robot dynamics equation of motion equates the torque rate vector to a sum of terms including joint angular velocity, acceleration and jerk terms each multiplied by an inertia matrix or a Coriolis matrix or a rate of change of one of the matrices.

9. The method according to claim 1 wherein the bounds on the torque rate vector are selected to maintain joint angular jerk values within defined limits.

10. The method according to claim 1 further comprising an end tooling mass-spring-damper system included in the objective function and the constraints of the optimization computation.

11. The method according to claim 10 wherein an end tooling oscillation is defined as a system state including a tool-to-arm residual displacement vector and a rate of change of the residual displacement vector, the objective function includes a term which penalizes the end tooling oscillation, and the constraints include an equation which models the mass-spring-damper system to predict the end tooling oscillation.

12. A method for robot predictive control, said method comprising:
    providing a motion program for a robot;
    performing a predictive control calculation, using a computer with a processor and memory, said calculation including an optimization computation which determines a torque rate vector to minimize robot end tooling oscillation and deviation from the motion program;
    providing the torque rate vector from the computer to the robot; and
    moving, by the robot, in response to the torque rate vector, wherein;
    the optimization computation includes an objective function which minimizes a difference between a predicted robot state and a reference robot state from the motion program while satisfying constraints including;
    a robot dynamics equation of motion which computes the predicted robot state based on the torque rate vector;
    an end tooling dynamics equation of motion which computes an end tooling oscillation state based on the predicted robot state; and
    a constraint defining bounds on the torque rate vector.

13. The method according to claim 12 wherein additional constraints used in the optimization computation define upper and lower bounds on state variables including joint angular position, velocity and acceleration vectors, and a joint torque vector.

14. A robot predictive control system, said system comprising:
    a robot; and
    a robot controller having a processor and memory, said controller being in communication with the robot and configured with a control module which performs a predictive control calculation, including an optimization computation with an objective function which determines a torque rate vector to minimize a difference between a predicted robot state and a reference robot state from a predefined motion program while satisfying a constraint defining a robot dynamics equation of motion which computes the predicted robot state based on the torque rate vector and a constraint defining bounds on the torque rate vector,
    wherein the robot controller provides the torque rate vector to the robot and the robot moves in response to the torque rate vector.

15. The system according to claim 14 wherein the torque rate vector includes a torque rate of change for each joint motor in the robot, and wherein the torque rate vector is defined as a control variable in the optimization computation, and state variables in the optimization computation include joint angular position, velocity and acceleration vectors, and a joint torque vector.

16. The system according to claim 14 wherein the optimization computation computes the predicted robot state for a series of steps over a planning horizon, and wherein the optimization computation is executed to convergence and the torque rate vector is provided to the robot at each control cycle of the robot controller.

17. The system according to claim 16 wherein, at each control cycle, a new value of the reference robot state from the motion program is provided, and a current actual robot state vector is provided as feedback to the robot controller and used as an initial condition constraint in the optimization computation.

18. The system according to claim 14 wherein additional constraints used in the optimization computation define upper and lower bounds on state variables including joint angular position, velocity and acceleration vectors, and a joint torque vector.

19. The system according to claim 14 wherein the robot dynamics equation of motion equates the torque rate vector to a sum of terms including joint angular velocity, acceleration and jerk terms each multiplied by an inertia matrix or a Coriolis matrix or a rate of change of one of the matrices.

20. The system according to claim 14 wherein the bounds on the torque rate vector are selected to maintain joint angular jerk values within defined limits.

21. The system according to claim 14 further comprising an end tooling mass-spring-damper system included in the objective function and the constraints of the optimization computation.

22. The system according to claim 21 wherein an end tooling oscillation is defined as a system state including a tool-to-arm residual displacement vector and a rate of change of the residual displacement vector, the objective function includes a term which penalizes the end tooling oscillation, and the constraints include an equation which models the mass-spring-damper system to predict the end tooling oscillation.

* * * * *